Aug. 12, 1924.
E. D. FEAR
SCALE
Filed Aug. 16, 1923    2 Sheets-Sheet 1
1,504,333
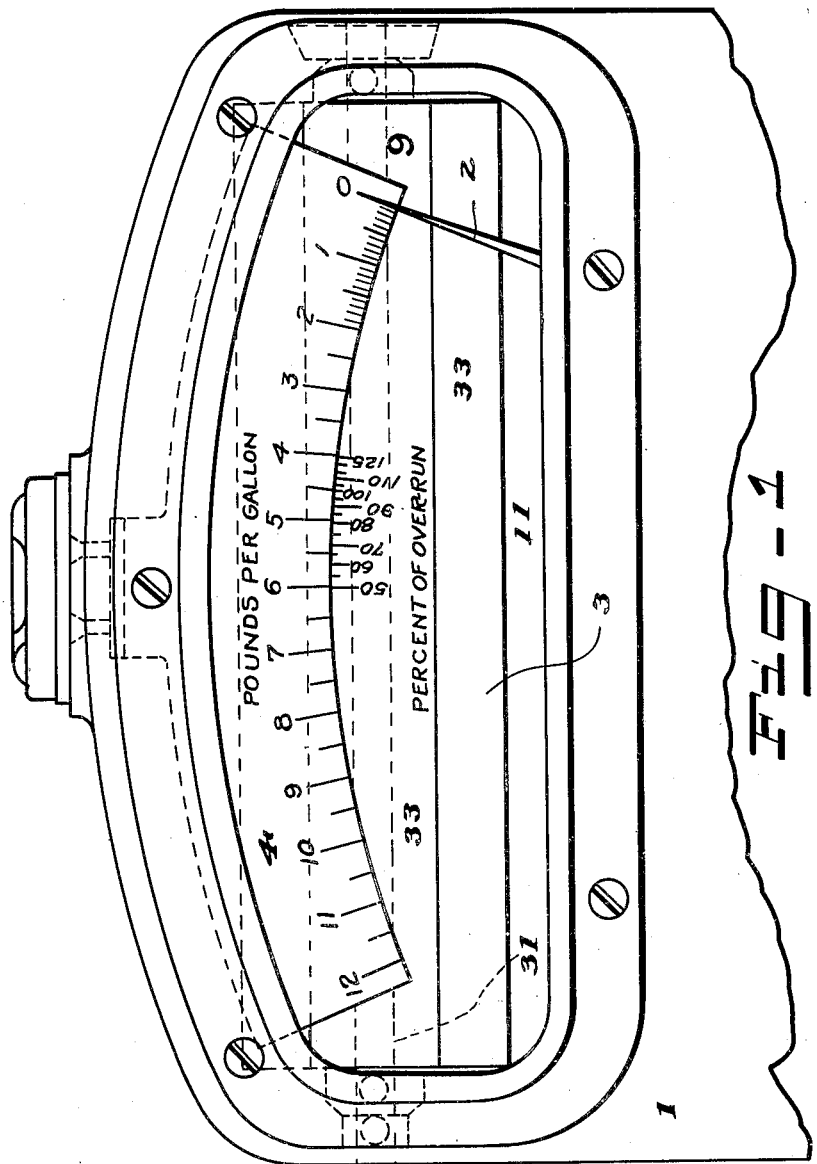

Aug. 12, 1924.

E. D. FEAR

SCALE

Filed Aug. 16, 1923

Inventor
Ernest D. Fear
By Reynolds
Attorneys

Patented Aug. 12, 1924.

1,504,333

UNITED STATES PATENT OFFICE.

ERNEST D. FEAR, OF KANSAS CITY, MISSOURI.

SCALE.

Applicatiin filed August 16, 1923. Serial No. 657,662.

*To all whom it may concern:*

Be it known that I, ERNEST D. FEAR, a citizen of the United States of America, and resident of the city of Kansas City, Jackson County, State of Missouri, have invented certain new and useful Improvements in Scales, of which the following is a specification.

My invention relates to scales and particularly to the indicating mechanism thereof, rather than to the balancing or weighing mechanism.

My invention is particularly intended for use in ice cream manufacture, although it will be understood that it may be used for other purposes. In manufacturing according to the method disclosed in my co-pending application Serial No. 456,776, filed March 21, 1921, ice cream may be manufactured, from mixes of various weights per unit volume, which will be a standard or selected weight per unit volume at the end of the overrun. However, many manufacturers prefer to take the mix as it comes from the mixer and to give it an overrun such that its volume is increased by a given percentage, disregarding the weight per unit volume of the finished product. It is to provide a scale which is adapted for the use of manufacturers in testing their product for overrun by either method that my present invention is intended.

It is also an object of my invention to provide a simple and convenient device for the above purpose.

My invention comprises those novel parts and combinations thereof which are shown in the accompanying drawings, described in the specification, and particularly defined in the claims terminating the same.

In the accompanying drawings I have shown my invention in the form which is now preferred by me.

Figure 1 is a face view as the operator would view the scale.

Figure 3:
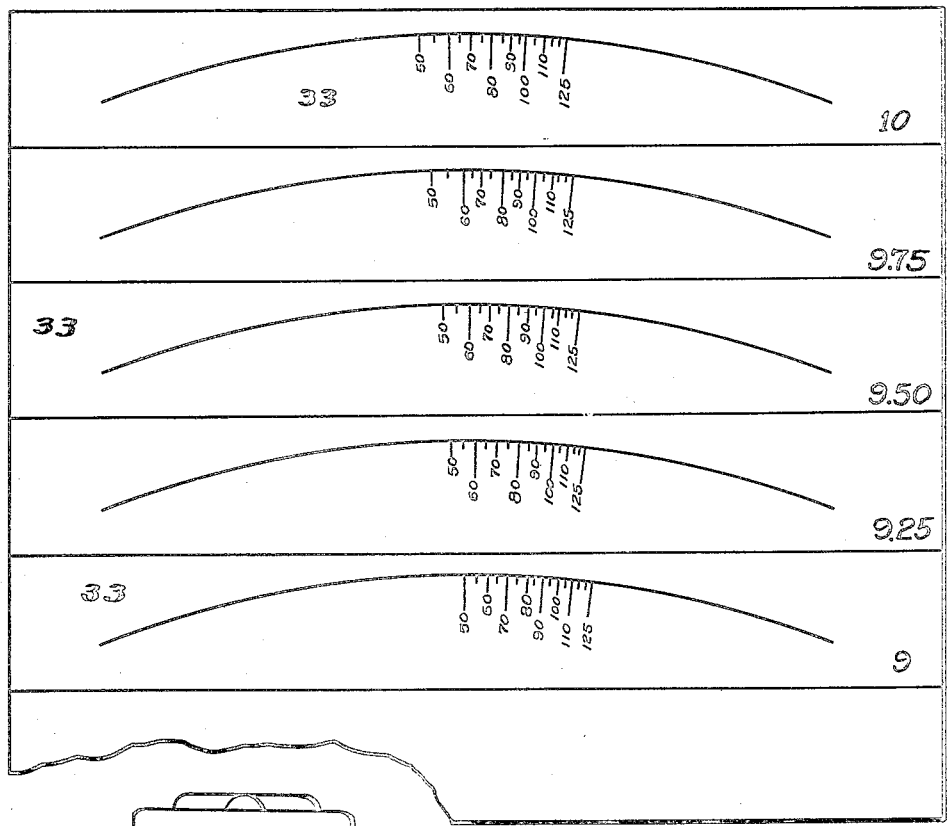
Figure 3 is a development of the various faces of the roller.
Figure 2:
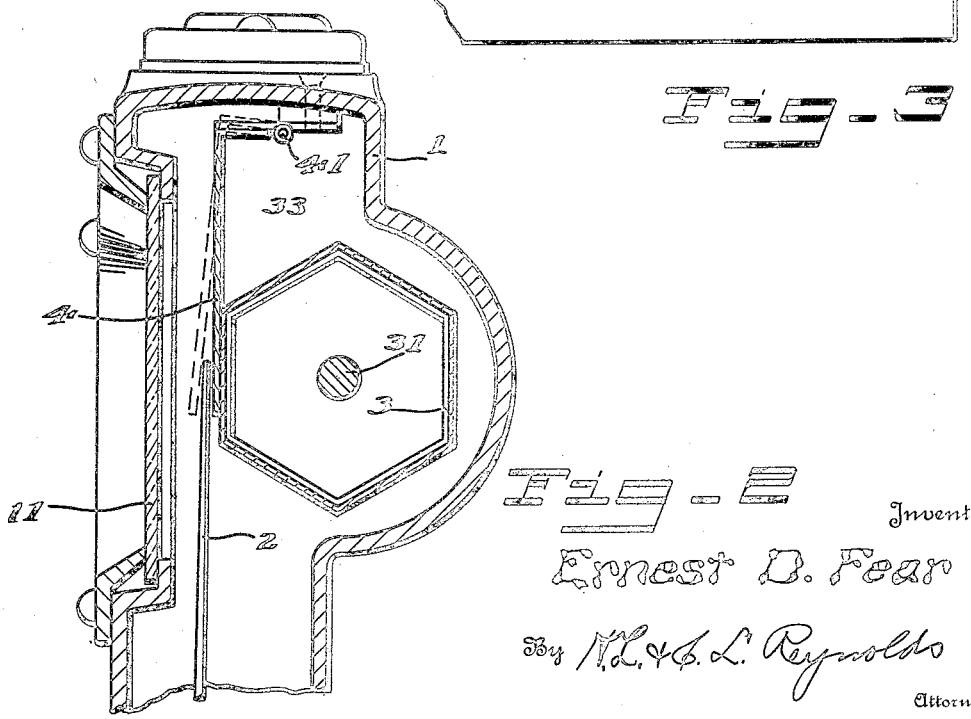
Figure 2 is a transverse section therethrough.

The parts of the scale are mounted within some suitable casing 1, having a window 11 in the face toward the operator through which can be seen a pointer 2. Immediately behind the pointer 2 and visible through the window 11, a roller 3 is journaled in the casing 1. One end of its shaft 31 extends through the casing 1 and is provided with a handle 32 by means of which the roller may be turned.

Preferably the roller is of polygonal shape in cross section and its various faces 33 bear scales which are computed upon different bases. I have shown the roller 3 as of hexagonal shape, and as may be seen from Figure 3, five scales are provided computed upon weights per unit gallon varying from nine pounds to ten pounds. One face is left blank, as it may not always be desirable to use these overrun scales upon the faces 33.

Associated with both the pointer 2 and the roller 3 I provide a stationary scale 4. This scale is adapted to lie behind the pointer 2 and closely adjacent the face 33 of the roller. The scale 4 is preferably flat and lies closely adjacent the face 33 of the roller which is closest to the window 11, and it lies substantially in the plane of the path of movement of the pointer 2 as the latter swings. The scale 4 is calibrated in units of weight upon which the scales upon the faces 33 are based, and may be called a basic scale.

In use let us assume that the weight of the mix is nine pounds per gallon. This may be determined by weighing a given volume of the mix and noting its weight upon the stationary or basic scale 4. If the weight of nine pounds per gallon be assumed and it is desired to give the mix a certain overrun by volume, the face 33 which bears the calibration based upon nine pounds per gallon is brought to the front. It will be noted that the scale 4 is pivoted at 41 above and slightly inward of the roller 3 so that it will give to permit the corners of the roller to swing it outward as the roller is rotated and so that the scale 4 will fall naturally by gravity into close contact with the face 33 which is outward. The pointer 2 may be made resilient or otherwise yielding, if placed so close to the scales as to be touched as the roller rotates.

Having now brought to the front the face 33 upon which the nine pounds per gallon scale is imprinted, the given volume of mix is weighed from time to time as the swelling progresses and its percentage of overrun may be read directly upon the face 33. For example, a mix of nine pounds per gallon, when given 100% overrun will weigh 4.5 pounds per gallon. Hence, the calibration 100 on the scale 33 will coincide with the calibration 4.5 on the scale 4. Similarly the calibrations for 50%, 60%, 70%, 80%, 90%, 110% and 125% overrun are calibrated and may be read directly upon the scale 33 once the weight per unit volume of the original mix has been determined. If the mix originally weighed 9.75 pounds per gallon, the face calibrated upon the basis of the scale 4 in such units is brought to the front and the percentage of overrun by volume is read directly therefrom in like manner.

For determining overrun according to a standard or selected mix, the scales upon the faces 33 may be disregarded, and also the weight of the original mix, and the mix may be given an overrun until its weight per unit volume coincides with that of the selected or standard mix. This is in accordance with my process as explained in my copending application referred to above. When proceeding in this manner the blank face of the roller 3 may be brought to the front in order that the figures on the faces 33 will not be confusing, or if desired, the blank face may be marked in accordance with the selected standard mix.

What I claim as my invention is:

1. In a scale, in combination with a swingable pointer, a flat stationary scale, and a roller polygonally shaped in cross-section, and having upon each face a different scale computed upon different bases relative to the stationary scale, said roller being journaled to be rotated to bring any one of its faces into registry with the path of movement of the pointer, and said flat scale being mounted for movement away from the faces of the roller to permit rotation thereof, and towards said faces to lie normally closely adjacent and coordinated with the scales upon said faces.

2. A scale as in claim 1, the flat scale being hingedly mounted to swing towards and from the faces of the roller, and being adapted to swing by gravity into contact with said faces.

3. In a scale, a casing having a window, a roller of polygonal cross section journaled in said casing behind said window, whereby one of its faces is visible therethrough, the faces of said roller having scales computed upon different bases, a handle connected to turn said roller and positioned exteriorly of the casing, a basic scale interposed between said window and roller, and adapted to lie normally closely adjacent the face of the roller which faces the window, and movable away therefrom to permit rotation of the roller, and a pointer swingable within said casing and registrable both with said basic scale and with the scale upon the roller.

Signed at Springfield, Massachusetts, this first day of August, 1923.

ERNEST D. FEAR.